(12) United States Patent
Van Dyke (10) Patent No.: US 8,636,414 B1
(45) Date of Patent: Jan. 28, 2014

(54) BEARING ASSEMBLY FOR OSCILLATION JOINT

(75) Inventor: Bryan Dale Van Dyke, Mt. Zion, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 13/567,138

(22) Filed: Aug. 6, 2012

(51) Int. Cl.
*F16C 17/00* (2006.01)
*F16C 25/00* (2006.01)

(52) U.S. Cl.
USPC ............................................ 384/129; 384/271

(58) Field of Classification Search
USPC ......... 384/110, 129, 192, 261, 262, 271, 276, 384/282, 295, 297, 298, 428, 107, 195, 197
See application file for complete search history.

(56) References Cited

U.S. PATENT DOCUMENTS

| | | | |
|---|---|---|---|
| RE6,490 E | 6/1875 | Kline | |
| 386,051 A | 7/1888 | Avery | |
| 3,578,828 A * | 5/1971 | Orkin et al. | 384/129 |
| 4,936,634 A | 6/1990 | Stratton et al. | |
| 5,397,184 A * | 3/1995 | Murai | 384/110 |
| 6,293,725 B1 | 9/2001 | Winkvist | |
| 6,609,765 B2 | 8/2003 | Radke et al. | |
| 7,959,169 B2 | 6/2011 | Gentry et al. | |

OTHER PUBLICATIONS

Van Dyke, Bryan Dale, United States Patent application "Tandem Power Train Assembly,", U.S. Appl. No. 13/567,722, filed Aug. 6, 2012.

* cited by examiner

*Primary Examiner* — Phillip A Johnson
(74) *Attorney, Agent, or Firm* — Eric D. Misfeldt

(57) ABSTRACT

A bearing assembly for an oscillation joint on a machine having a tandem wheel drive. The bearing assembly rotatably supports an oscillating hub rotatably connected to a shaft. The bearing assembly includes a frustoconical inboard bearing having a first bearing surface and a frustoconical outboard bearing having a second bearing surface disposed thereon positioned such that the first and second bearing surfaces form a generally v-shaped bearing interface between the shaft and the hub.

16 Claims, 8 Drawing Sheets

BEARING ASSEMBLY FOR OSCILLATION JOINT

TECHNICAL FIELD

The present disclosure is directed to a bearing assembly, and more particularly, to a bearing sleeve having a generally frustoconical shape for use in an oscillation joint.

BACKGROUND

Machines such as, for example, motor graders, wheel tractor scrapers, dozers, wheel loaders, and other types of heavy equipment are used to perform terrain leveling tasks. These machines are often operated over uneven terrain, causing individual wheels to be displaced relative to the machine's frame as the machine's wheels track the uneven terrain. In machines with a tandem wheel drive assembly, the tandem assembly is connected to the machine via a single axle with a pair of wheels mounted to a drive housing positioned on each side of the vehicle via a pivoting or oscillation joint. The oscillation joint pivotally connects the chassis to the outwardly positioned drive housing while enclosing the power relaying components of the drive assembly. With a known conventional suspension incorporating pivoting or oscillation joints, the machine's wheels track the terrain and the suspension is structured to manage downward as well as shear forces imparted on the wheels during machine operation. An example of a machine incorporating an oscillation joint is described in U.S. Pat. No. 7,959,169 issued to Gentry et al.

In particular, the oscillation joint is housed within an axle assembly, and is located in proximity to the differential and away from the wheels which makes the oscillation joint prone to higher forces due to the moment arm effect between the wheels and the differential. Traditionally, the bearing geometry within the oscillation joint consist of two vertically oriented thrust washers sandwiching a cylindrical ring bearing which is positioned between the portion of the housing enclosing the axle and the drive housing. As the oscillation joint wears, the thrust rings' respective clearances increase resulting in increased side-to-side movement and, as a result, premature wear ensues.

Maintenance of the traditional oscillation joint typically requires adding shims to one or both of the thrust washers to take up the gap caused by wear of the thrust washers. This causes added expense and machine downtime. Moreover, the ring bearing may wear at a different rate than the pair of thrust washers resulting in additional maintenance events and the replacement of unevenly worn components. Additionally, the individual thrust washers may experience different degrees of wear. Such uneven wear often results in early replacement of the bearing combination within the oscillation joint. Moreover, using axial shims only addresses the axial forces that are experienced within the joint and does not allow for radial gap adjustment. A typical method of providing for both radial and axial gap adjustment in a rotating application is to utilize opposing tapered roller bearings or crossed roller bearings. However, known tapered roller bearings have predetermined angularity between the roller bearings and the axial direction of the oscillation joint. Custom made units of tapered roller bearings and crossed roller bearings are expensive and often impractical for large diameter bearing applications.

The present disclosure is directed to overcoming one or more of the shortcomings set forth above.

SUMMARY OF THE INVENTION

In an exemplary embodiment, the present disclosure is directed to a bearing assembly to rotatably support an oscillating hub rotatably connected to a shaft. The bearing assembly comprises an inboard bearing defining a first frustoconical ring having a first bearing surface disposed thereon, and an outboard bearing defining a second frustoconical ring having a second bearing surface disposed thereon. The bearing assembly is arranged such that the first bearing surface of the first frustoconical ring and the second bearing surface of the second frustoconical ring are positioned relative to one another to form a generally v-shaped bearing interface between the shaft and the hub.

DETAILED DESCRIPTION

Figure 1:
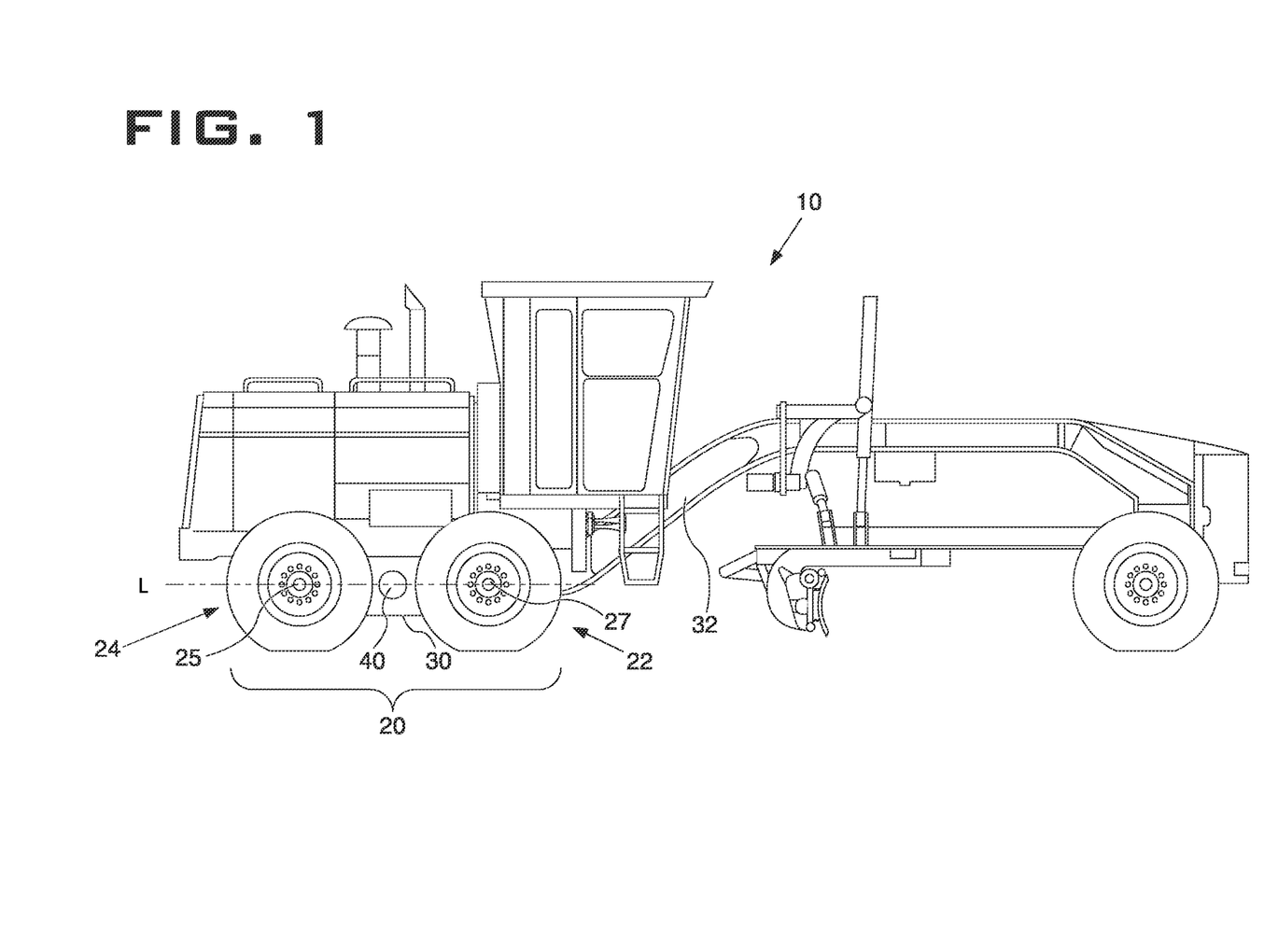
FIG. 1 is a diagrammatic illustration of an exemplary machine.
Figure 2:
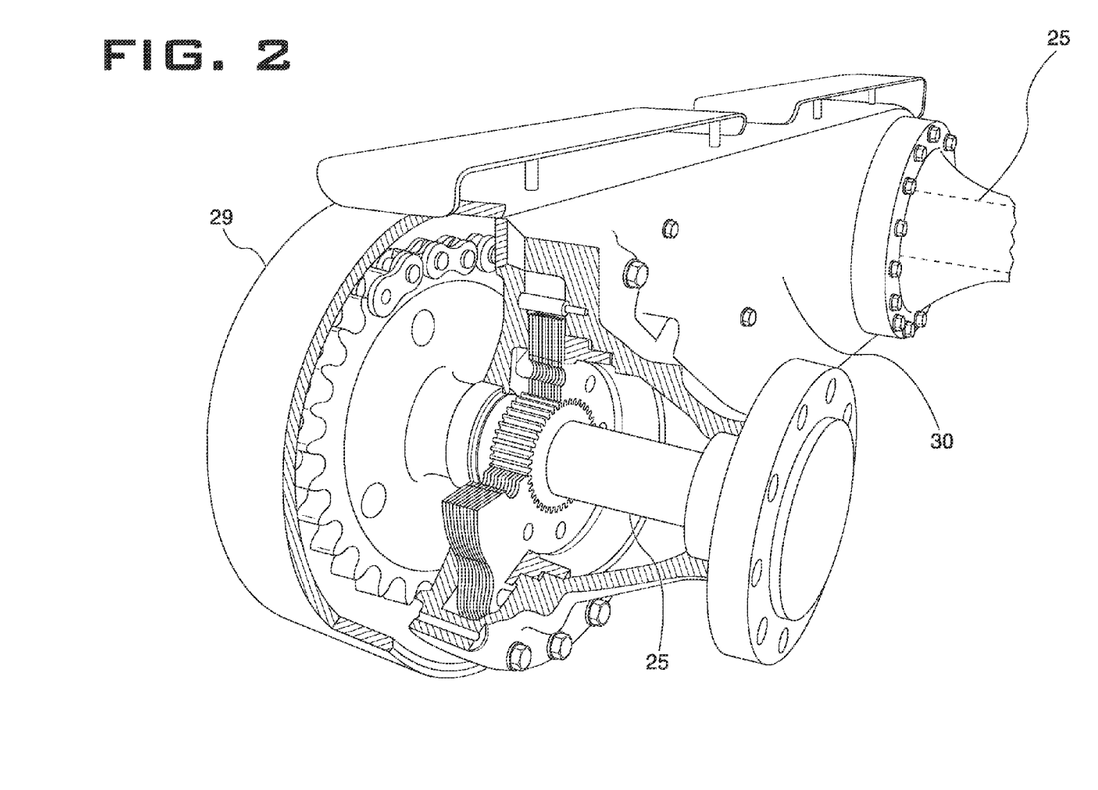
FIG. 2 is a perspective view of a drive casing.

FIG. 1 illustrates machine 10 having a tandem wheel drive 20 which includes forward wheel 22 and rear wheel 24. The wheels are connected to drive shaft 54 which, in turn, connected to drive axle 56 which is rotatably supported within drive casing 30, and drive casing 30 is in turn mounted to the body chassis 32. The drive casing 30, as best seen in FIG. 2, is a rigid structure that supports rotating rear and front axles 25, 27. Positioned on inner side 29 of casing 30 is oscillating hub 90 which is rotatably connected to shaft 68 of the axle assembly 28 through oscillation joint 40. The forward wheel 22 is positioned forward of the oscillation joint 40 relative to the machine 10 and the rear wheel 24 is positioned to the rear of the oscillation joint 40. While FIG. 1 depicts the right side of the machine 10, an identical tandem wheel drive 20 would be provided on the left side as well.

Figure 3:
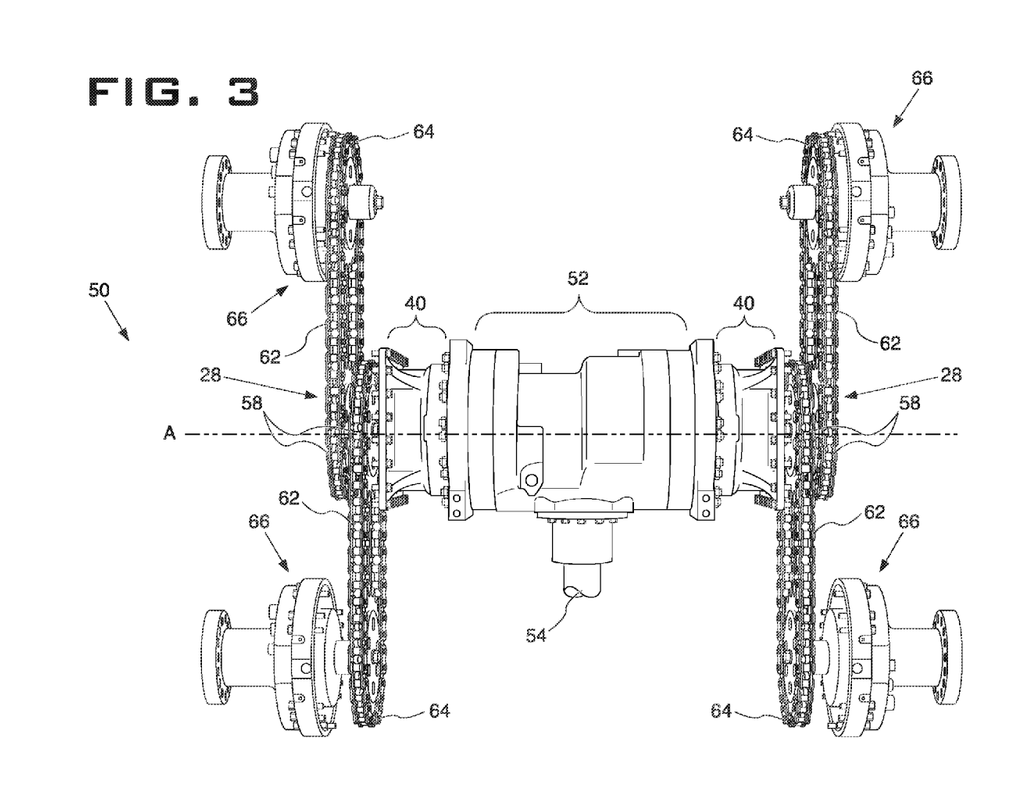
FIG. 3 is a top view of the tandem wheel lower drive train of the machine of FIG. 1.

FIG. 3 depicts the lower drive train assembly 50 of the tandem wheel drive 20. The lower drive train assembly 50 includes centrally located differential 52 connected to drive shaft 54 which is in turn driven by a power source, such as an engine (not shown). Extending from each side of the differential 52 are drive axles 56. In an exemplary embodiment, drive axle 56 has chain drive sprocket 58 affixed to an end of the drive axle 60. Each chain drive sprocket 58 drives a chain loop 62 which in turn drives a wheel sprocket 64 associated with each wheel assembly 66. Rotation of the drive shaft 54 provides power to the differential 52, which in turn drives the rotation of a drive axle 56 which rotates about a central axis that substantially corresponds to the oscillation joint axis A.

Figure 4A:
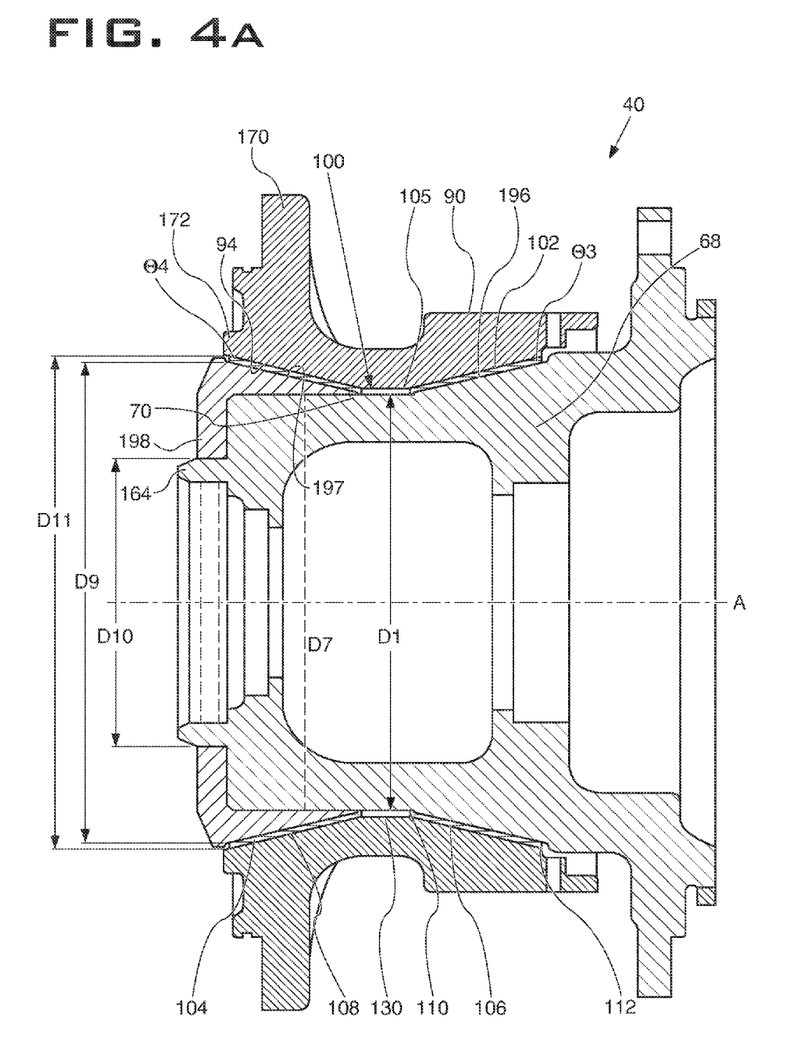
FIG. 4A is a cross section of an exemplary oscillation joint.

FIG. 4A depicts a sectional view of an exemplary oscillation joint 40. The oscillation joint 40 includes a shaft portion 68 having a cylindrical outer surface section 70 that surrounds and is centered about oscillation joint axis A. In one embodiment, the shaft portion 68 has a diameter $D_1$ of about 225 mm to about 750 mm in the area of the cylindrical outer surface section 70. Positioned over and surrounding the cylindrical outer surface 70 is an oscillating hub 90 having an inner contact surface 94. The oscillating hub 90, when its inner contact surface 94 is positioned over the outer surface 70, is rotatable relative to the shaft portion 68.

Positioned between the cylindrical surface 70 and the inner surface 94 of the oscillating hub 90 is a bearing assembly 100. In an exemplary embodiment, the bearing assembly 100 comprises an inboard bearing 102 on the machine 10 side of the oscillation joint 40 and an outboard bearing 104 on the drive casing 30 side of the oscillation joint 40. The relative positioning of the inboard bearing 102 and the outboard bearing 104 in the bearing assembly 100 is such that a generally v-shaped bearing interface 105 is formed between the shaft 68 and the oscillating hub 90.

In the exemplary embodiment depicted in FIG. 4A, the inboard bearing 102 is supported on its side facing the shaft portion 68 by an inclined surface 103 that extends between the cylindrical surface 70 and shoulder wall 76. The inclined surface 103 may be a cast portion of the shaft 68 or may be machined into the surface of the shaft. The outboard bearing 104 is supported in its side facing the shaft portion by an inclined surface 107 that extends from a mounting plate 160 which will be discussed further herein.

Figure 4B:
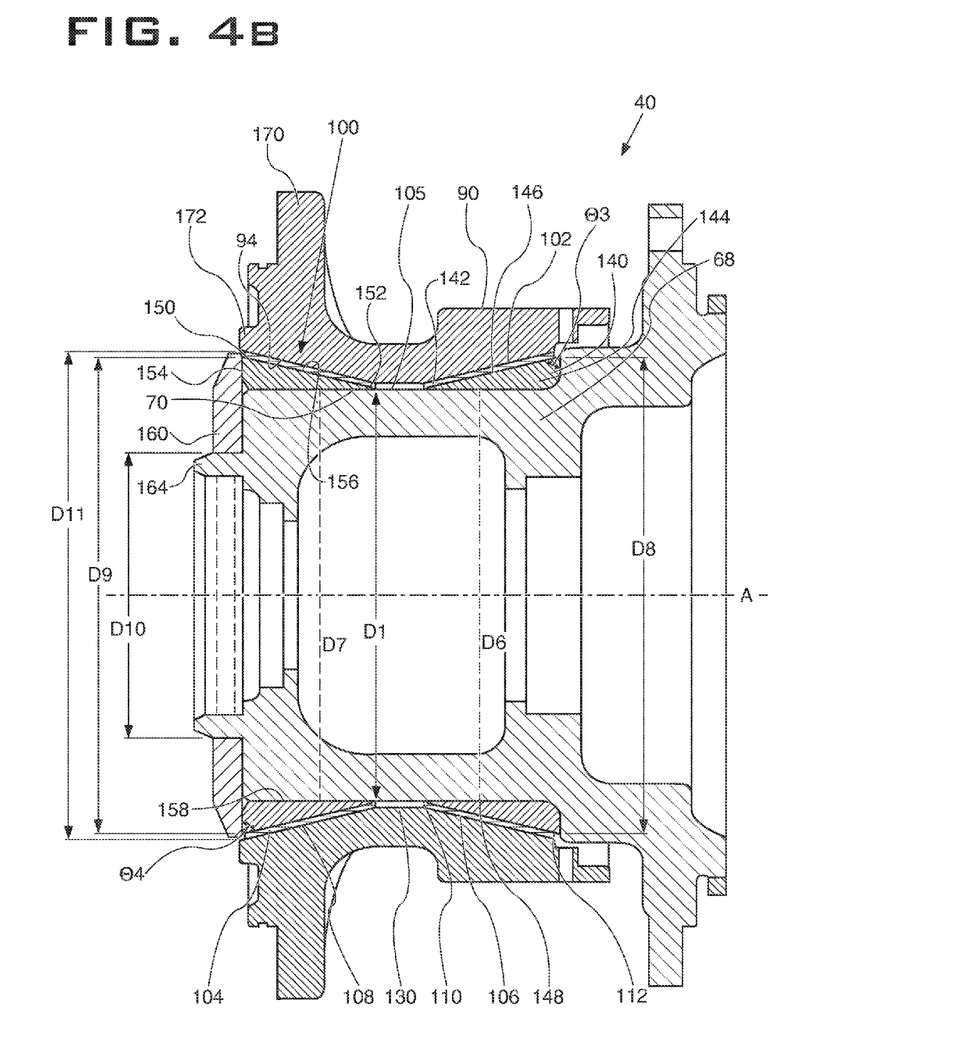
FIG. 4B is a cross-section of another exemplary oscillation joint.

FIG. 4B depicts a sectional view of an alternative exemplary oscillation joint 40 that is similar to the oscillation joint depicted in FIG. 4A with the exception that the inboard bearing 102 and outboard bearing 104 are supported by inboard collet 140 and outboard collet 150, respectively, which will be discussed further herein.

Figure 5A:
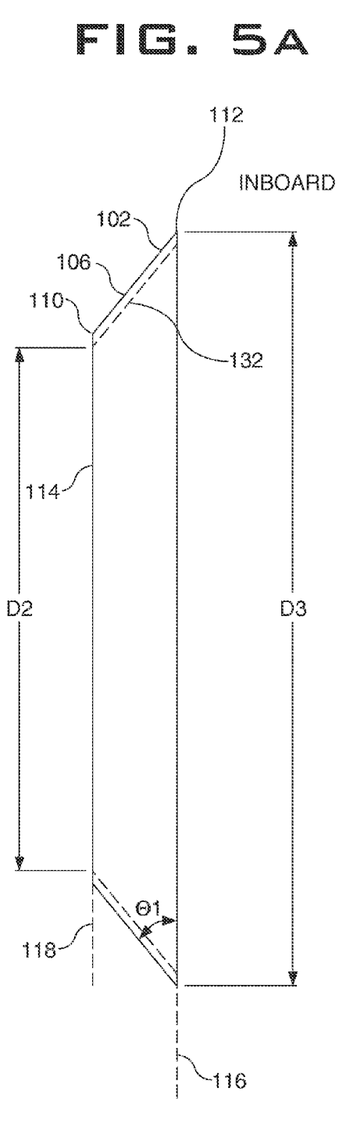
FIG. 5A is a side view of an inboard bearing.
Figure 5B:
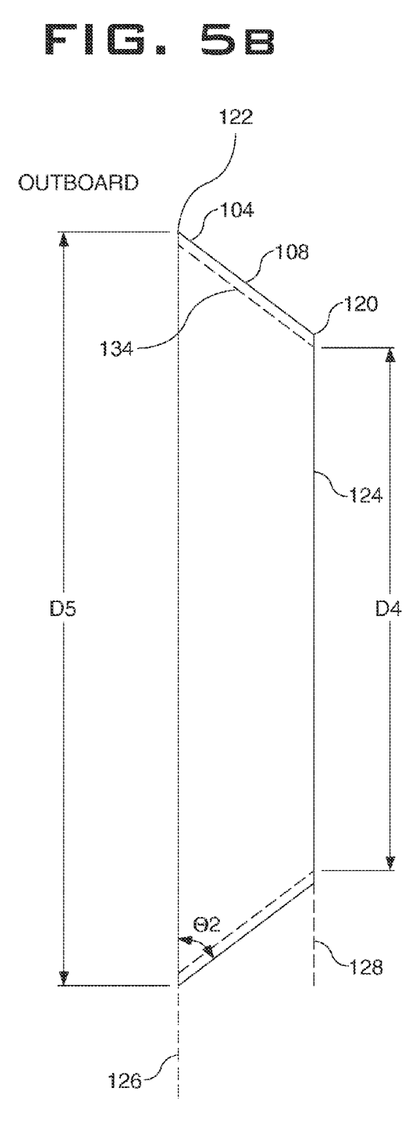
FIG. 5B is a side view of an outboard bearing.

The inboard bearing 102 as depicted in FIGS. 4A, 4B and 5A is in the shape of a first frustoconical ring and is provided with a first bearing surface 106 along its outer surface. Similarly, the outboard bearing 104 as depicted in FIGS. 4A, 4B and 5B, is in the shape of a second frustoconical ring and is provided with a second bearing surface 108.

The frustoconical ring of the inboard bearing 102 has an apical end 110 and a base end 112 and the first bearing surface 106 of the inboard bearing 102 is generally disposed between the apical end 110 and base end 112. The aperture 114 at the apical end 110 of the inboard bearing 102 has a diameter $D_2$ of about 225 mm to about 750 mm. The diameter $D_2$ of the aperture 114 is substantially equal to the diameter $D_1$ of the cylindrical portion 70 of the shaft 68.

The base end 112 of the inboard bearing 102 is generally contained within a plane 116 parallel to a plane 118 containing the apical end 110. In an exemplary embodiment, the first bearing surface 106 is at an angle $\theta_1$ of about 9 degrees to about 28 degrees relative to the base end 112.

In an exemplary embodiment, the base end 112 of the inboard bearing 102 has an outer diameter $D_3$ of about 300 mm to about 784 mm.

The frustoconical ring of the outboard bearing 104 has an apical end 120 and a base end 122 and the second bearing surface 108 of the outboard bearing 104 is generally disposed between the apical and 120 and the base end 122. The aperture 124 at the apical end 120 of the outboard bearing 104 has a diameter $D_4$ of about 225 mm to about 750 mm. The diameter $D_4$ of the aperture 124 is substantially equal to the diameter $D_1$ of the cylindrical portion 70 of the shaft 68.

The base end 122 of the outboard bearing 104 is generally contained within a plane 126 parallel to a plane 128 containing the apical end 120. In an exemplary embodiment, the second bearing surface 108 is at an angle $\theta_2$ of about 46 degrees to about 50 degrees relative to the base end 122.

In an exemplary embodiment, the base end 122 of the outboard bearing 104 has an outer diameter $D_5$ of about 309 mm to about 784 mm.

The inboard bearing 102 and the outboard bearing 104 may be formed from any known bearing material known in the art. For example, the bearing material may be formed from a metal based material such as chrome steel, stainless steel, carbon alloy steel, and the like. The bearing material may preferably be made from a non-metallic material. Non-metallic bearing materials suitable for the present bearing assembly 100 include ceramic, nylon, plastics, and a phenolic cotton and resin compound. The phenolic cotton and resin compound is particularly preferred due to its durability and being relatively inexpensive. Additionally, the phenolic cotton and resin compound has the ability to be thermoformed to a desired shape from a flat sheet stock. When a curved strip of the phenolic cotton and resin compound is passed through a set of heat rollers, the resultant shape is a frustoconical ring. The specific curvature of the curved strip cut from the flat sheet stock can be modified so as to provide the desired angle in the frustoconical ring.

The inboard bearing 102, as described above, is in the form of a frustoconical ring extending from an apical end 110 to a base end 112. The inboard bearing 102 has a first bearing surface 106 provided on the exterior surface of the frustoconical ring and an interior surface 132 on the side opposite the first bearing surface 106. The thickness of the inner bearing 102 between the first bearing surface 106 and the interior surface 132 is about 3 mm to about 10 mm.

Similarly, the outboard bearing 104, is in the form of a frustoconical ring extending from an apical end 120 to a base end 122. The outboard bearing 104 has a second bearing surface 108 provided on the exterior surface of the frustoconical ring and an interior surface 134 on the side opposite the second bearing surface 108. The thickness of the outer bearing 104 between the second bearing surface 108 and the interior surface 134 is about 3 mm to about 10 mm.

The term "generally v-shaped" as used above can be understood to mean a relative arrangement that is defined by an interface 105 wherein the apical ends 110, 120 of the inboard and outboard bearings 102, 104 are immediately adjacent each other and are separated by less than about 1 mm. The term may also be understood to mean a relative arrangement where the apical ends 110, 120 are separated from each other such that there is a flat landing area 130 between the apical ends 110, 120. The flat landing area 130 coincides with an open area of the cylindrical surface 70 of the shaft 68 not covered by either the inboard 102 or outboard 104 bearings. In such an arrangement where there is a flat landing area 130, the apical ends 110, 120 may be separated by a distance of about 4 mm to about 180 mm.

Similarly, the inner contact surface 94 of the oscillating hub 90 will have a generally v-shaped profile in cross section that projects into the generally v-shaped bearing assembly 100. The inner contact surface 94 for a particular oscillation joint 40 will have a generally v-shaped profile that corresponds to the generally v-shaped bearing assembly 100 formed on the shaft 68 to provide a tight and cohesive oscillation joint 40 for the machine 10.

In an exemplary embodiment as depicted in FIG. 4B, the bearing assembly 100, further includes an inboard collet 140 for supporting the inboard bearing 102. The inboard collet 140 has a cross-section that is generally in the form of a right triangle. The inboard collet has an apical end 142, a base end 144, a supporting surface 146 and a cylindrical through bore 148. The base end 144 projects substantially perpendicularly away from the through bore 148. The supporting surface 146 is sized and angled such that it has generally the same size and angled surface of the interior surface 132 of the inboard bearing 102. As such, the supporting surface 146 is at an angle $\theta_3$ of about 9 degrees to about 28 degrees relative to the base end 144. The inboard bearing 102 can be placed onto the inboard collet 140 such that the entire interior surface 132 of the inboard bearing 102 is supported by the supporting face 146 of the inboard collet 140.

The through bore 148 of the inboard collet 140 has a diameter $D_6$ of about 225 mm to about 750 mm. The diameter $D_6$ of the through bore 148 is substantially equal to the diameter $D_1$ of the cylindrical portion 70 of the shaft 68. By the diameter $D_1$ of the through bore 148 being matched to the diameter $D_1$ of the cylindrical portion 70 of the shaft 68, a tight, non-rotating fit is provided between the inboard collet 140 and the cylindrical portion 70. The inboard collet 140 may have an axial length of about 5 mm to about 25 mm. Further, the base end 144 of the inboard collet 140, which projects perpendicularly away from the through bore 148, may have an outer diameter $D_8$ of about 300 mm to about 784 mm. The base end 144 is sized to not extend above a supporting shoulder wall 76 provided on the shaft 68 as will be discussed below.

In an exemplary embodiment, the bearing assembly 100, further includes an outboard collet 150 for supporting the outboard bearing 104. The outboard collet 150 has a cross-section that is generally in the form of a right triangle. The inboard collet has an apical end 152, a base end 154, a supporting surface 156 and a cylindrical through bore 158. The base end 154 projects substantially perpendicularly away from the through bore 158. The supporting surface 156 is sized and angled such that it has generally the same size and angled surface of the interior surface 134 of the outboard bearing 104. As such, the supporting surface 156 is at an angle $\theta_4$ of about 46 degrees to about 50 degrees relative to the base end 154. The outboard bearing 104 can be placed onto the outboard collet 150 such that the entire interior surface 134 of the outboard bearing 104 is supported by the supporting face 156 of the outboard collet 150.

The through bore 158 of the outboard collet 150 has a diameter $D_7$ of about 225 mm to about 750 mm. The diameter $D_7$ of the through bore 158 is substantially equal to the diameter $D_1$ of the cylindrical portion 70 of the shaft 68. By the diameter $D_7$ of the through bore 158 being matched to the diameter $D_1$ of the cylindrical portion 70 of the shaft 68, a tight, non-rotating fit is provided between the outboard collet 150 and the cylindrical portion 70. The outboard collet 150 may have an axial length of about 15 mm to about 30 mm. Further, the base end 154 of the outboard collet 150, which projects perpendicularly away from the base end 154, may have an outer diameter $D_9$ of about 309 mm to about 784 mm.

The bearing assembly may further be provided with an annular mounting plate 160 sized to interact with an end face 74 of the shaft and to hold the bearing assembly 100 in place. The mounting plate 160 may be fixedly held in place by a fastening device 162 such as a bolt or screw. The mounting plate 160 has an through hole 164 with a diameter $D_{10}$ less than the diameter $D_1$ of the cylindrical face and an outer diameter $D_{11}$ sized substantially similar to the outer diameter $D_9$ of the outer collet base end 154.

In another exemplary embodiment as depicted in FIG. 4A, the inboard bearing 102 is supported on its interior surface 132 by inclined surface 103. Inclined surface 103 has a similarly angled and shaped supporting surface 196 to the supporting surface 146 of inboard collet 140 described above. However, rather than providing a separate inboard collet 140, in this embodiment, the inclined surface 103 is a unitary piece with the shaft 68. The angled face of the inclined surface 103 extends from the cylindrical surface 70 shoulder wall 76 of the shaft and is angled to support the interior surface 132 of the inboard bearing 102.

In an exemplary embodiment, the outer collet 150 and the mounting plate 160 may be formed from a single piece to form a retaining collet 198. This combined piece serves the function of both the outer collet 150 and mounting plate 160 as described above and provides an inclined surface 107. Inclined surface 107 has a similarly angled and shaped supporting surface 197 to the supporting surface 156 of outboard collet 150 described above.

INDUSTRIAL APPLICABILITY

As described above, the oscillation joint 40 allows independent rotation of the drive casing 30 about the oscillation joint axis A. The rotation about the oscillation joint 40 allows the machine 10 to operate more smoothly over rough terrain. For example, when the machine 10 is moving in a forward direction and the right side forward wheel 22 as depicted in FIG. 1 encounters an obstacle, such as a rock, the forward wheel would move upwardly and cause a counterclockwise rotation of the drive casing 30 about the oscillation joint axis A. When the forward wheel 22 is on the rock, the axle of the forward wheel 23, oscillation joint axis A, and the axle of the rear wheel 25 remain in a straight line L with the front wheel elevated relative to the rear wheel 24. As the forward wheel 22 passes over and drops back down from the rock, the drive casing 30 rotates clockwise about the oscillation joint axis A until the line L is again substantially horizontal (or parallel with the ground). When the rear wheel 24 then encounters the rock, the rear wheel 24 would, in a manner similar to the forward wheel 22, move upwardly and cause a clockwise rotation of the drive casing 30 about the oscillation joint axis A. When the rear wheel 24 is on the rock, the axle of the forward wheel 23, oscillation joint axis A, and the axle of the rear wheel remain in a straight line L with the rear wheel 24 elevated relative to the forward wheel 22. As the rear wheel 24 passes over and drops down from the rock, the drive casing rotates counterclockwise about the oscillation joint axis A until the line L is substantially horizontal. The rotation of the oscillation joint 40 when the wheel 22, 24 are passing over obstacles also allows more accurate terrain leveling operation.

Figure 6:
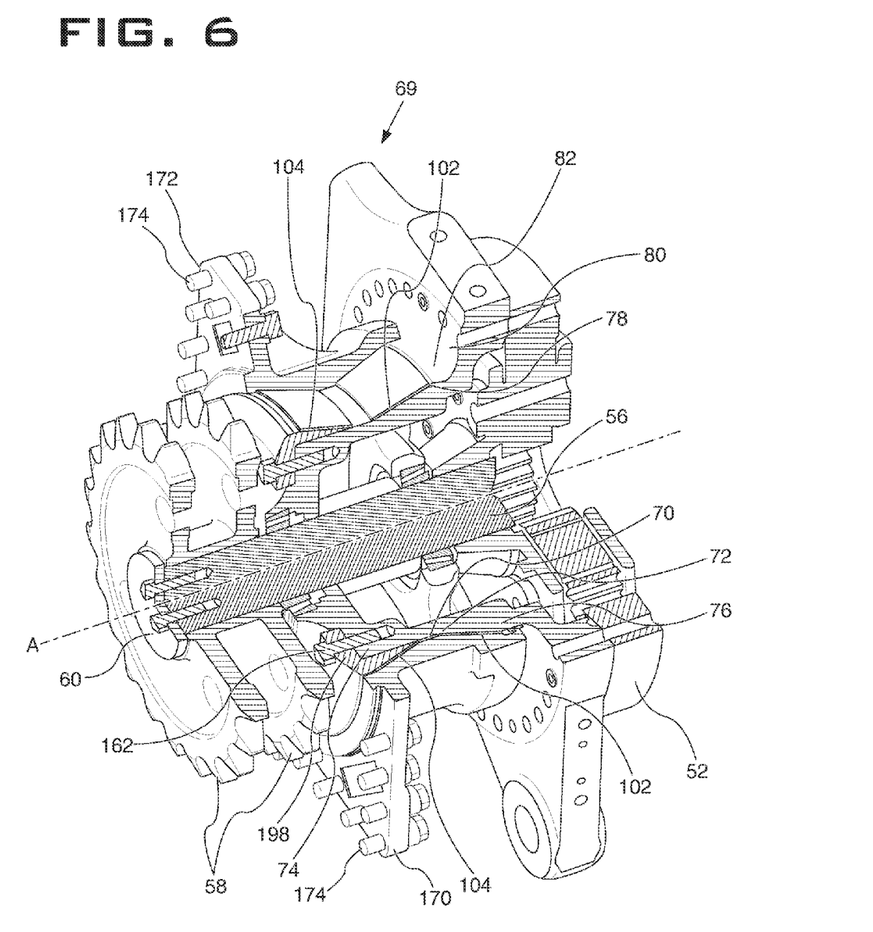
FIG. 6 is a sectional perspective view of the exemplary oscillation joint.

FIG. 6 depicts a section of a portion of the oscillation joint 40. In an exemplary embodiment, the drive axle 56, passes through a shaft portion 68 of the oscillation joint 40. As described above, the shaft 68 has a cylindrical outer surface 70 that surrounds and is centered about oscillation joint axis A. The cylindrical outer surface has a first end 72 proximal to the differential 52 and a second end distal to the differential have an end face 74 projecting perpendicular and radially inwardly from the cylindrical outer surface 70. In the embodiment depicted in FIG. 4B and described above, extending perpendicular and radially outward from the cylindrical surface 70 from the first end 72 is a shoulder wall 76 having a height of about 15 to about 40 mm between the cylindrical surface 70 and a top edge 78. The shoulder substantially extends around the circumference of the inner housing 68 and has a diameter greater than that of the cylindrical outer surface 70. In the embodiment depicted in FIG. 4A and described above, inclined surface 103 extends from the first end of the cylindrical surface to the location of the shoulder 76. The inner housing 69, which includes shaft 68 and shoulder wall 76, additionally includes a flange surface 80 for fixedly connecting the inner housing 69 to the differential 52. The flange surface 80 may be connected to the differential 52 using bolts, screws, welding, or any other known method of fixedly attaching pieces together. By fixedly attached, it is intended that the inner housing and the differential do not rotate relative to one another. The inner housing may also be provided with a second cylindrical surface 82 extending from the shoulder top edge 78 to the flange 80 joining the structures.

The oscillating hub 90, as described above, has a generally v-shaped inner contact surface 94 that corresponds to the generally v-shaped bearing assembly 100 about with the oscillating joint 40 rotates. The inner contact surface 94 surrounds the shaft 68 and contacts at least the inboard bearing 102 and the outboard bearing 104. The oscillating hub 90 is also provided with an outer flange 170 positioned at the outboard side 172 of the oscillating hub 90. The outer flange 170 is provided so that the oscillating hub 90 can be fixedly connected to the drive casing 30. The oscillating hub 90 may be connected to the drive casing using a fastening device 174 such as bolts, screws, or any other known method of fixedly attaching pieces together.

The generally v-shaped arrangement of the bearing assembly 100 provides an even wear profile in the oscillation joint 40. By providing the inboard bearing 102 and outboard bearing 104 at angles tailored to the dimensions of the oscillation joint and to the forces experienced within the joint, an extended life wear profile is provided as compared to a similar oscillation joint using a thrust washer and thrust ring arrangement. In addition to handling the standard vertical forces that are experienced within the joint, the oscillation joint also handles horizontal forces that would be experienced in a side impact to a wheel. Basically, the impact force is transmitted to the sloping v-shaped portion of the oscillation joint bearing and due to its shape, any wear to the bearing does not result in "play" or a "wear-gap" at the bearings.

Additionally, the axial positioning of the oscillation joint bearing assembly 100 on the shaft 68, as well as adjustment of axial gaps, can be achieved through the use of shims (not shown). The shims are formed from thin metallic washers sized to fit over the cylindrical portion 70 of the shaft 68. If required, the shims may be placed between either the shoulder wall 76 and the base end 144 of the inboard collet 140, between the annular mounting plate 160 and the base end 154 of the outboard collet 150, or both.

Figure 7:
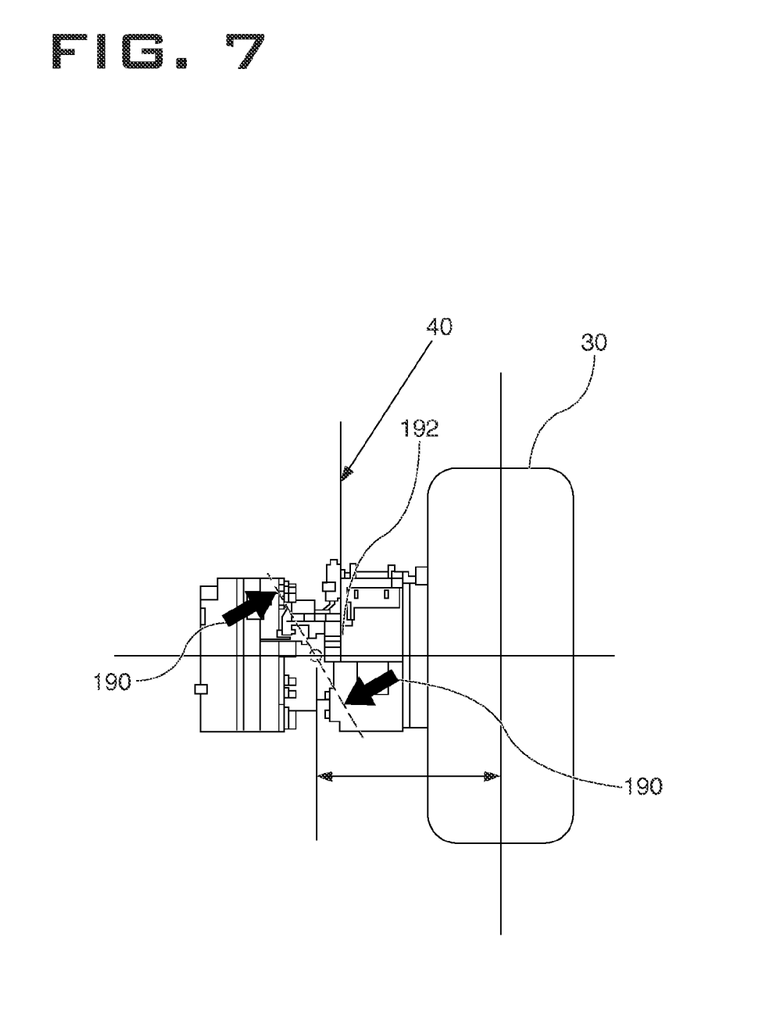
FIG. 7 is a diagram of the forces in the oscillation joint.

For the inboard bearing 102, the angle $\theta_1$ for the first bearing surface 106 is perpendicular to the force couple 190 resisting the tipping moment. This angle is parallel to a line through the contact point on the inboard bearing 102 and outboard bearing 104. For the outboard bearing 104, the angle $\theta_2$ for the second bearing surface 108 is perpendicular to the angle of the vector sum of the reaction force due to the force couple 190 resisting the tipping moment and the vertical load 192 which is reacted to by the outboard bearing 104 (see FIG. 7). The optimal angle of the inboard bearing 102 and the outboard bearing 104 as calculated may vary by plus or minus 5 degrees based on the rim and tire selection for a particular machine. Variables for calculating the optimal angles for a variety of machines having an oscillation joint are contained in Table 1.

The results for determining the optimal angles based on the below calculation for determining the optimal angle are contained in Table 2.

Distance between contact points=(inboard bearing outer diameter/2+outboard bearing outer diameter/2)$^2$+((Outboard Bearing Axial)$^2$)$^{0.5}$ Angle off of vertical(radians)=a sin(axial distance between outer edges of sleeve bearings/distance between contact points)

Inboard Bearing Optimal Angle off of vertical(degrees)=angle off of vertical(radians)×180/π.

Ratio of force couple reaction magnitude to tire force vertical load=joint center to tire center axial/distance between contact points Vertical component of ratio=sin(angle off of vertical)× joint center to tire center axial/distance between contact points Horizontal component of ratio=cos(angle off of vertical)××joint center to tire center axial/distance between contact points Vertical sum=1+vertical component of ratio Angle of resultant vector from vertical(radians)=a tan(horizontal component of ratio/vertical sum)

Angle of resultant vector from vertical (degrees)=Angle of resultant vector from vertical (radians)×180/π.

Outboard bearing optimal angle off of vertical=90− Angle of resultant vector from vertical(degrees)

The results for determining the optimal angles based on the above formulas are contained in Table 2. The results are summarized in Table 3

TABLE 1

| Machine | Units | 1 | 2 | 3 | 4 | 5 | 6 | 7 | 8 | 9 | 10 | 11 |
|---|---|---|---|---|---|---|---|---|---|---|---|---|
| Axial Dimensions | | | | | | | | | | | | |
| Inboard Bearing Axial | mm | 0 | 0 | 0 | 0 | 0 | 0 | 0 | 0 | 0 | 0 | 0 |
| Outboard Bearing Axial | mm | 159 | 159 | 159 | 159 | 159.2 | 159.2 | 160.2 | 160.2 | 160 | 176 | 128 |
| Joint Center to Tire Center Axial | mm | 572.8 | 572.8 | 572.8 | 572.8 | 601 | 601 | 601.5 | 601.5 | 689.3 | 688 | 929 |
| Radial Dimensions | | | | | | | | | | | | |
| Inboard Bearing Outer Diameter | mm | 300 | 300 | 300 | 300 | 300 | 303 | 300 | 300 | 402 | 447 | 784 |

TABLE 1-continued

| Machine | Units | 1 | 2 | 3 | 4 | 5 | 6 | 7 | 8 | 9 | 10 | 11 |
|---|---|---|---|---|---|---|---|---|---|---|---|---|
| Outboard Bearing Outer Diameter | mm | 309 | 309 | 309 | 309 | 309 | 309 | 309 | 309 | 405 | 450 | 784 |

TABLE 2

| | | Calculations | | | | | | | | | | |
|---|---|---|---|---|---|---|---|---|---|---|---|---|
| Machine | Units | 1 | 2 | 3 | 4 | 5 | 6 | 7 | 8 | 9 | 10 | 11 |
| Distance between contact points | mm | 344 | 344 | 344 | 344 | 344 | 345 | 344 | 344 | 434 | 481 | 794 |
| Angle off of vertical | rad | 0.48113 | 0.48113 | 0.48113 | 0.48113 | 0.48165 | 0.47963 | 0.48422 | 0.48422 | 0.37744 | 0.37431 | 0.16184 |
| Inboard bearing optimal angle off of vertical | deg | 27.5667 | 27.5667 | 27.5667 | 27.5667 | 27.5963 | 27.4809 | 27.7438 | 27.7438 | 21.6259 | 21.4464 | 9.2726 |
| Ratio of force couple reaction magnitude to tire force vertical load | ratio | 1.667 | 1.667 | 1.667 | 1.667 | 1.7488 | 1.7420 | 1.74788 | 1.74788 | 1.5877 | 1.4293 | 1.1695 |
| Vertical Component of Ratio | | 0.7715 | 0.7715 | 0.7715 | 0.7715 | 0.7101 | 0.8039 | 0.8137 | 0.8137 | 0.5852 | 0.5226 | 0.1884 |
| Horizontal Component of Ratio | | 1.4779 | 1.4779 | 1.4779 | 1.4779 | 1.5498 | 1.5455 | 1.5469 | 1.5469 | 1.4759 | 1.3303 | 1.5418 |
| Vertical Sum | | 1.7715 | 1.7715 | 1.7715 | 1.7715 | 1.8101 | 1.8039 | 1.8137 | 1.8137 | 1.5852 | 1.5230 | 1.8884 |
| Angle of resultant vector from vertical | rad | 0.6953 | 0.6953 | 0.6953 | 0.6953 | 0.7081 | 0.7084 | 0.7062 | 0.7062 | 0.7497 | 0.7181 | 0.7708 |
| Angle of resultant vector from vertical | deg | 39.83657 | 39.83657 | 39.83657 | 39.83657 | 40.57051 | 40.58855 | 40.46192 | 40.46192 | 42.9574 | 41.1444 | 44.16226 |
| Outboard bearing optimal angle off of vertical | deg | 50.16343 | 50.16343 | 50.16343 | 50.16343 | 49.42949 | 49.41145 | 49.53808 | 49.53808 | 47.0426 | 48.8556 | 45.83774 |

TABLE 3

| | | Results Summary | | | | | | | | | | |
|---|---|---|---|---|---|---|---|---|---|---|---|---|
| Machine | unit | 1 | 2 | 3 | 4 | 5 | 6 | 7 | 8 | 9 | 10 | 11 |
| Optimal inboard bearing angle | deg | 28 | 28 | 28 | 28 | 28 | 27 | 28 | 28 | 22 | 21 | 9 |
| Optimal outboard bearing angle | deg | 50 | 50 | 50 | 50 | 49 | 49 | 50 | 50 | 47 | 49 | 46 |

The disclosed oscillation joint and bearing assembly may be an inexpensive, effective solution for reducing bearing wear in the oscillation joint of a machine.

It will be apparent to those skilled in the art that various modifications and variations may be made to the disclosed oscillation joint and bearing assembly. Other embodiments will be apparent to those skilled in the art from consideration of the specification and practice of the disclosed oscillation joint and bearing assembly. It is intended that the specification be considered as exemplary only, with a true scope being indicated by the following claims and their equivalents.

What is claimed is:

1. A bearing assembly to rotatably support an oscillating hub rotatably connected to a shaft, the bearing assembly comprising:
    an inboard bearing defining a first frustoconical ring having a first bearing surface disposed thereon, and
    an outboard bearing defining a second frustoconical ring having a second bearing surface disposed thereon,
    wherein said first bearing surface of said first frustoconical ring and said second bearing surface of said second frustoconical ring being positioned relative to one another to form a generally v-shaped bearing interface between said shaft and said hub, wherein the bearing assembly further comprises an outboard collet comprising an apical end, a base end, and a supporting face, the supporting face of the outboard collet supporting the outboard bearing on an interior surface opposite the second bearing surface, and wherein the bearing assembly further comprises a mounting plate configured for mounting to an end face of the shaft and for retaining the outboard collet in the bearing assembly.

2. The bearing assembly of claim 1, wherein the first bearing surface is disposed between a base end and an apical end of the inboard bearing, the apical end having an aperture with a diameter of 225 mm to 750 mm.

3. The bearing assembly of claim 2, wherein the first bearing surface is at an angle of 9 degrees to 28 degrees relative to the base end of the inboard bearing.

4. The bearing assembly of claim 1, wherein the second bearing surface is disposed between a base end and an apical end of the outboard bearing, the apical end having an aperture with a diameter of 225 mm to 750 mm.

5. The bearing assembly of claim 4, wherein the second bearing surface at an angle of 46 to 50 degrees relative to the base end of the outboard bearing.

6. The bearing assembly of claim 1, wherein the inboard bearing and outboard bearing have a substantially uniform thickness of 3 mm to 10 mm.

7. The bearing assembly of claim 1, wherein the inboard bearing has a base end having an outboard diameter of 300 mm to 784 mm.

8. The bearing assembly of claim 1, wherein the outboard bearing has a base end having an outer diameter of 309 mm to 784 mm.

9. The bearing assembly of claim 1, wherein the inboard bearing and the outboard bearing are formed from a non-metallic material.

10. The bearing assembly of claim 9, wherein the non-metallic material is a phenolic cotton and resin compound.

11. The bearing assembly of claim 1, wherein the bearing assembly further comprises an inboard inclined surface extending from an inboard side of the shaft comprising a supporting face, the supporting face of the inboard inclined surface supporting the inboard bearing on an interior surface opposite the first bearing surface.

12. The bearing assembly of claim 11, wherein the inboard inclined surface supporting surface is at an angle of 9 degrees to 28 degrees relative a line perpendicular with the central axis of the shaft.

13. The bearing assembly of claim 1, wherein the outboard collet comprises a cylindrical through bore having a diameter of 225 mm to 750 mm, the base end projects perpendicular to the through bore, and the base end has an outer diameter of 309 mm to 784 mm.

14. The bearing assembly of claim 1, wherein the outboard collet supporting surface is at an angle of 46 degrees to 50 degrees relative to the base end of the outboard collet.

15. The bearing assembly of claim 1, wherein the mounting plate and the outboard collet are a single piece.

16. The bearing assembly of claim 1, wherein the bearing assembly further comprises a inboard collet comprising an apical end, a base end, and a supporting face, the supporting face of the inboard collet supporting the inboard bearing on an interior surface opposite the first bearing surface, wherein the inboard collet comprises a cylindrical through bore having a diameter of 225 mm to 750 mm, the base end projects perpendicular to the through bore, and the base end has an outer diameter of 300 mm to 784 mm, and wherein the inboard collet supporting surface is at an angle of 9 degrees to 28 degrees relative to the base end of the inboard collet.

* * * * *